(No Model.)
H. M. HUMPHREY.
BRACKET.
No. 386,248. Patented July 17, 1888.
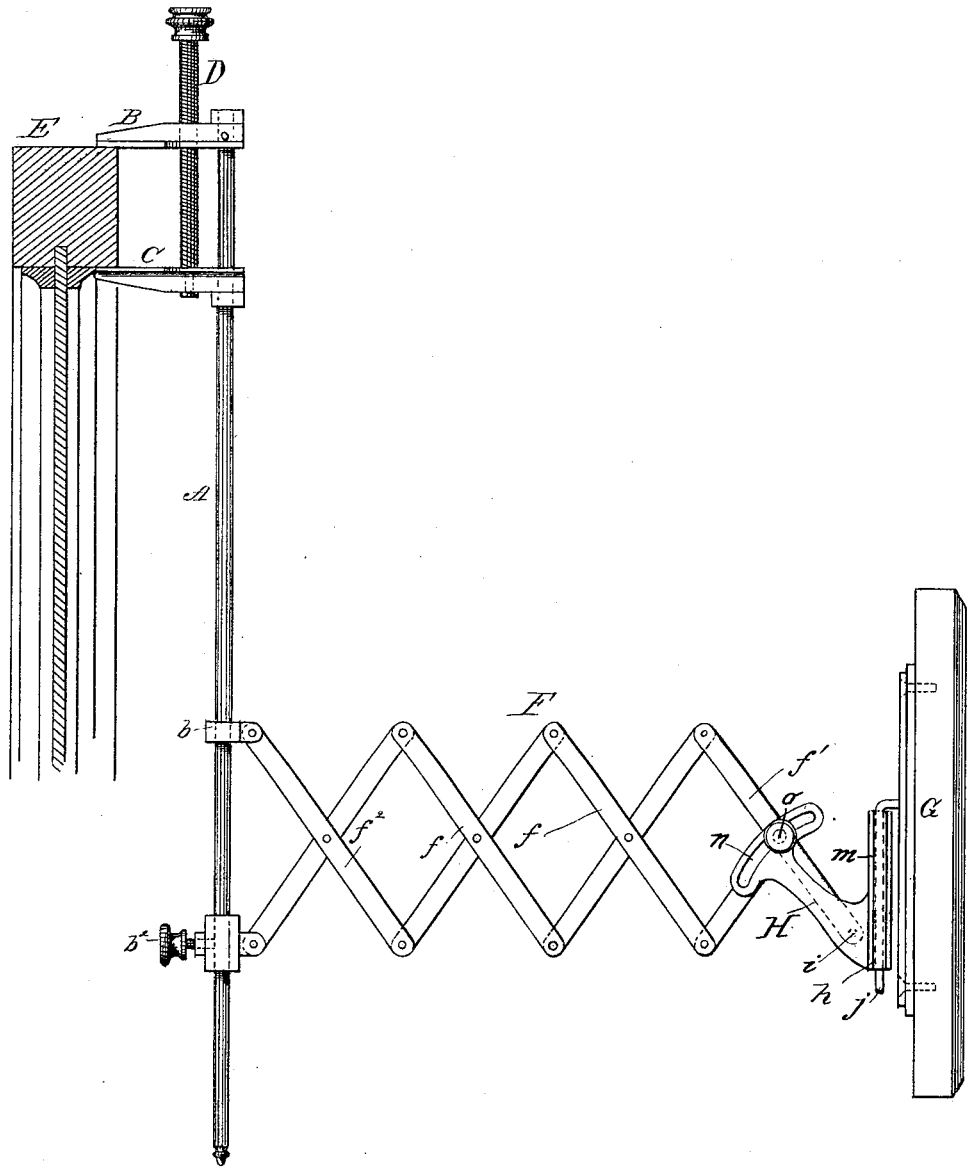
WITNESSES:
Wm Twitchell.
C Sedgwick.
INVENTOR:
H. M. Humphrey.
BY Munn &Co
ATTORNEYS.

UNITED STATES PATENT OFFICE.

HELEN M. HUMPHREY, OF CLAYVILLE, NEW YORK.

BRACKET.

SPECIFICATION forming part of Letters Patent No. 386,248, dated July 17, 1888.

Application filed August 23, 1887. Serial No. 247,663. (No model.)

*To all whom it may concern:*

Be it known that I, HELEN M. HUMPHREY, of Clayville, in the county of Oneida and State of New York, have invented a new and Improved Bracket, of which the following is a full, clear, and exact description.

My invention relates to an adjustable bracket designed more particularly for shaving and toilet mirrors and adapted to be attached to a window or other convenient support, and adapted also to be folded in small space, so as to be readily packed in a satchel or trunk.

The invention consists of the construction, arrangement, and combination of parts, all as hereinafter described and claimed.

Reference is to be had to the accompanying drawing, forming a part of this specification, in which the figure is a side elevation of my invention as it appears when attached to a window-frame.

A represents a small rod or bar, provided at its upper end with a fixed jaw, B, and sliding jaw C, which latter is worked by a screw, D, fitted in a screw-threaded opening in the jaw B, so that these jaws constitute a clamp for attaching the rod A to a window-frame, E, or other convenient support. Attached to the rod A is the bracket-arm F, made up of a series of connected lazy-tongs, $f f' f^2$, so that the arm may be extended or contracted in length, as desired, to hold the mirror G at any desired position, and so that the said arm may be folded up to occupy small compass in a trunk or satchel.

The lazy-tongs $f'$ is provided with an adjusting device, H, for holding the mirror so that it may be tipped backward or forward, as desired. Said adjusting device H is pivoted at $i$, and is formed with the sleeve $m$, to receive the bent rod $j$ of the mirror, and is also formed with the curved slot $n$, through which passes a set-screw, $o$, for securing the adjusting device to hold the mirror at any desired angle.

Having thus fully described my invention, I claim as new and desire to secure by Letters Patent—

1. The mirror G, having a fastening-rod, $j$, at its back, in combination with the lazy-tongs F, adjustable plate H, and set-screw $n$, the said plate being formed with a curved slot, $o$, to receive the screw $n$, and with a sleeve, $m$, to receive the rod $j$, substantially as described.

2. As a new article of manufacture, the rod A, provided with a clamping device at one end, the lazy-tongs F, attached to the rod A, and the mirror G, in combination with the adjustable plate H and set-screw $o$, the said plate being formed with a curved slot, $n$, and pivoted to one of the bars of the lazy-tongs, substantially as described.

HELEN M. HUMPHREY.

Witnesses:
P. V. ROGERS,
CORREL HUMPHREY.